United States Patent [19]
Yazawa et al.

[11] 3,748,624
[45] July 24, 1973

[54] PYROMETRIC SENSOR USING THERMISTOR

[75] Inventors: Akio Yazawa, Oobu; Tadashi Hattori, Nishio, both of Japan

[73] Assignee: Nippondenso Co., Ltd., Aichi-ken, Japan

[22] Filed: Feb. 25, 1972

[21] Appl. No.: 229,491

[30] Foreign Application Priority Data
Mar. 30, 1971  Japan............................... 46/18995

[52] U.S. Cl..................................... 338/30, 338/322
[51] Int. Cl............................................. H01c 7/00
[58] Field of Search....................... 338/28, 30, 229, 338/330, 332, 322, 323; 73/362 AR, 342 AR

[56] References Cited
UNITED STATES PATENTS

| | | | |
|---|---|---|---|
| 2,505,936 | 5/1950 | Behn | 338/30 X |
| 2,529,038 | 11/1950 | Medlar et al. | 338/30 X |
| 2,818,482 | 12/1957 | Bennett | 338/30 |
| 2,736,784 | 2/1956 | Gore | 338/30 |
| 2,753,714 | 7/1956 | Perkins et al. | 338/30 X |

*Primary Examiner*—C. L. Albritton
*Attorney*—John W. Malley, G. Lloyd Knight et al.

[57] ABSTRACT

A pyrometric sensor using a thermistor which is highly resistant to vibrations and heat, comprising a heat-sensing unit formed by inserting a pyrometric thermistor into a metallic protecting tube, connecting lead wires of the thermistor to the protecting tube and a center electrode, and packing a heat-resistant insulating material into said protecting tube. The section of the heat-sensing unit where the thermistor is not located is partly inserted into a hole of an adapter for receiving the protecting tube, an insulating tube is held within the adapter, an upper electrode is secured to the insulating tube by a flange of the electrode itself and a lock nut in thread engagement with a threaded part of the electrode, and the center electrode of the heat-sensing unit is connected to said upper electrode.

4 Claims, 7 Drawing Figures

Patented July 24, 1973  3,748,624

PYROMETRIC SENSOR USING THERMISTOR

BACKGROUND OF THE INVENTION

1. Field of the Invention

This invention relates to a pyrometric sensor using a thermistor, and more specifically to a pyrometric sensor useful for measuring the temperatures of the hot parts which are being subjected to vibrations.

2. Description of the Prior Art

Usually available instruments for determining high temperatures around 1,000°C include electrical resistance thermometers, pyrometers using resistance bulbs, optical pyrometers, and pyrometric instruments which utilize radiant heat or the voltage level of thermal noise of a resistor. Those known pyrometers have disadvantages. For example, the electrical resistance thermometers and the pyrometers using resistance bulbs yield such low voltages which can be taken out as outputs that they need a highly sensitive amplifier or very accurate temperature indicator. In either case, this adds to the manufacturing cost and, moreover, the instruments are not suitable for measuring the temperatures of the objects being vibrated. The optical pyrometers and the pyrometers which utilize radiant heat require compensation and are unable to measure the temperatures of the parts which are not transmissible. The instruments which depend upon the voltage level of thermal noise of a resistor need an amplifier of a high amplification degree at an additional cost.

SUMMARY OF THE INVENTION

It is an object of this invention, therefore, to provide a pyrometric sensor which is simple in con-struction and yet is capable of measuring the temperatures of the hot parts up to about 1,300°C which are subject to vibrations of not more than about 100 G in terms of acceleration.

DESCRIPTION OF THE PREFERRED EMBODIMENTS

Figure 1:
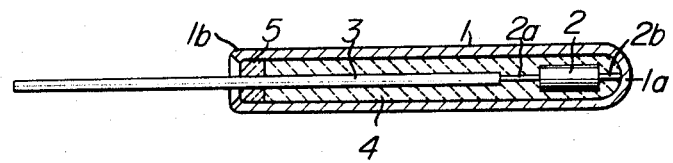
FIGS. 1 to 5 are longitudinal sectional views of different heat-sensing units for pyrometry illustrating different embodiments of the present invention.

Referring to FIG. 1, there is shown a metallic protecting tube 1 having a circular cross section and open at one end. It is made, for example, of stainless steel Grade SUS42 conforming to the Japanese Industrial Standards (equivalent to AISI 310S) or such trademarked products as "Inconel 600" or "Pyromax."

Figure 2:
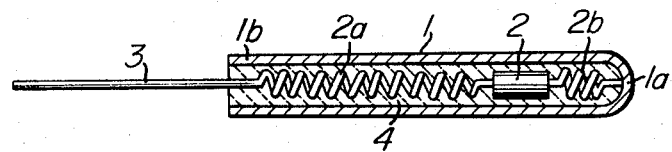
Figure 7:
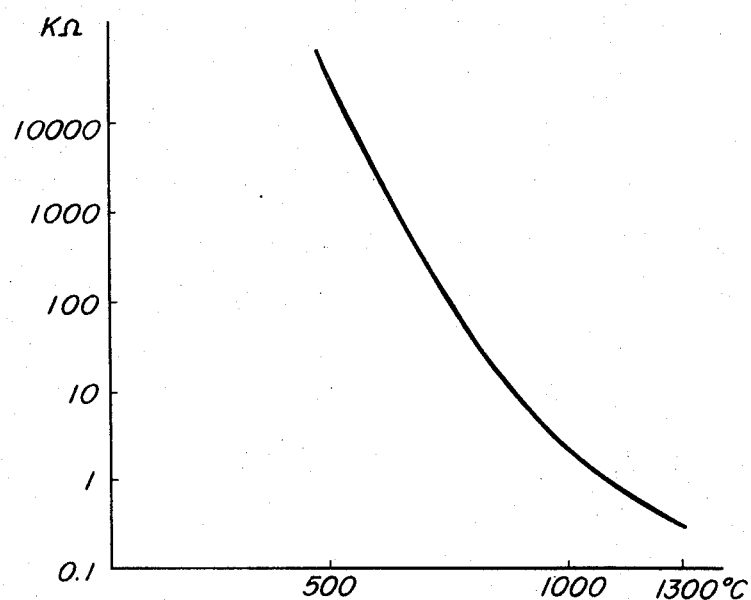
FIG. 7 is a graph illustrating the characteristic of a pyrometric thermistor employed for the instrument of the invention.

The numeral 2 indicates a pyrometric thermistor, e.g., cobalt aluminum oxide ($CoAl_2O_4$). Lead wires 2a, 2b, as of platinum, are connected to the both ends of the pyrometric thermistor 2. The characteristic of the thermistor 2 is graphically represented in FIG. 7 wherein the temperature is plotted on the axis of abscissa against the resistance on the axis of ordinate. Referring back to FIG. 1, the numeral 3 indicates a center electrode, e.g., of SUS42 or nichrome. The pyrometric thermistor 2 is inserted in the protecting tube 1, and the lead wire 2b in connection therewith at one end is secured at the other end to the inner wall of the closed end of the tube. The other lead wire 2a is connected to the end of the center electrode 3. Alternatively said lead wire 2a may be long enough to replace the center electrode 3 to serve also as such. The space between the inner wall surface of the protecting tube 1 and the thermistor 2 and center electrode 3 accommodated therein is packed with magnesium oxide powder as a heat-resistant insulating material 4. An insulating stopper 5 of alumina ceramics or the like is fitted in the open end 1b of the protecting tube to prevent the magnesium oxide powder from leaking out of the tube. Along the periphery of the insulating stopper 5 the open end 1b of the protecting tube 1 is pressed and bent inwardly. The use of magnesium oxide powder as the heat-resistant insulating material 4 provides a pyrometric sensor which can measure temperatures up to about 1,300°C and prove adequately durable against vibrations resulting from acceleration up to about 100 G. In another embodiment shown in FIG. 2, the lead wire 2b and the lead wire 2a or part of the center electrode 3 are coiled and magnesium oxide powder as the heat-resistant insulating material 4 is filled in the protecting tube 1, and then the tube is squeezed as it is passed through a die having an inside diameter smaller than the outside diameter of the tube itself. This reduction in the diameter of the tube increases the density of the magnesium oxide powder 1 therein, and the vibration resistance of the resulting heat-sensing unit is improved over that of the embodiment shown in FIG. 1. The product is about as resistant to heat as the counterpart of FIG. 1. Still another embodiment shown in FIG. 3 uses a mixture of 99 to 70 wt. percent aluminum oxide power and 1 to 30 wt. percent metallic oxide powder, e.g. the power of CaO, $SiO_2$, or MgO, as the heat-resistant insulating material 4. These ingredients are mixed up and filled under pressure into the protecting tube 1, and then heated together.

When a heat-resistant insulating material 4 as mentioned above is employed and compressed into the tube with subsequent heating, the powder undergoes setting with shrinkage on burning, a process generally known as false baking. As a result, this embodiment attains a vibration resistance as good as or even better than that of the embodiment of FIG. 2. Its thermal resistance is about the same as that of the embodiment shown in FIG. 1. Alternatively, it is possible to pack the protecting tube 1 with the heat-resistant insulating material 4 prepared by mixing the same ingredients in the same mixing ratio as referred to above but without the application of pressure, squeeze the tube 1 diametrally, and then heat the tube. The heat-sensing unit obtained in this way exhibits about the same vibration resistance and heat resistance as the embodiment of FIG. 3. Yet another embodiment shown in FIG. 4 employs an insulating tube of burnt alumina ceramics as the heat-resistant insulating material 4. The tube is inserted between the inner wall surface of the protecting tube 1 and the thermistor 2 and center electrode 3, the open end 1b of the protecting tube being pressed and bent inwardly to hold the insulating material in place.

Figure 3:
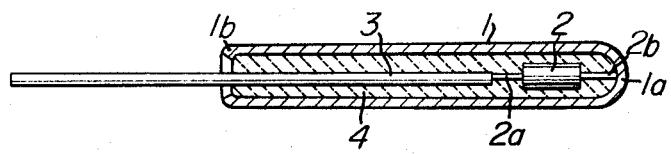
Figure 4:
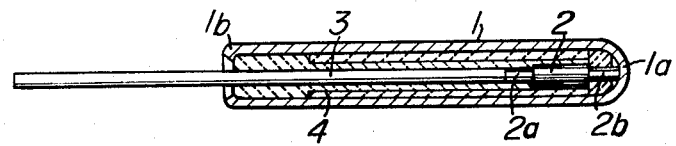
Figure 5:
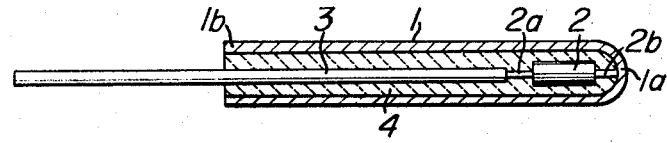

The heat-resistant insulating material 4 employed in the manner just described improves the both thermal resistance and vibration resistance of the product over those of the embodiment of FIG. 3. A further embodiment shown in FIG. 5 uses as the heat-resistant insulating material 4 either refractory mortar or castable refractories, which is filled in the protecting tube and set with or without the application of heat. In this case the free end 1b of the protecting tube need not be caulked inwardly. With the heat-resistant insulating material 4 chosen as above, the embodiment is substantially as resistant to heat and vibration as the embodiment of FIG. 3. Where it is practically not objectionable to limit the heat resistance to the range of 800° to 1,200°C, the heat-resistant insulating material 4 of FIG. 5 may be replaced by sealing glass powder or crystallizing glass powder, in which case the powder is filled in the protecting tube 1 and heated for fusing or crystallization. With such a heat-resistant insulating material 4 the heat resistance of the heat-sensing unit thereby obtained is restricted to the softening point of the glass, but the vibration resistance is not less than that of the embodiment shown in FIG. 3.

Figure 6:
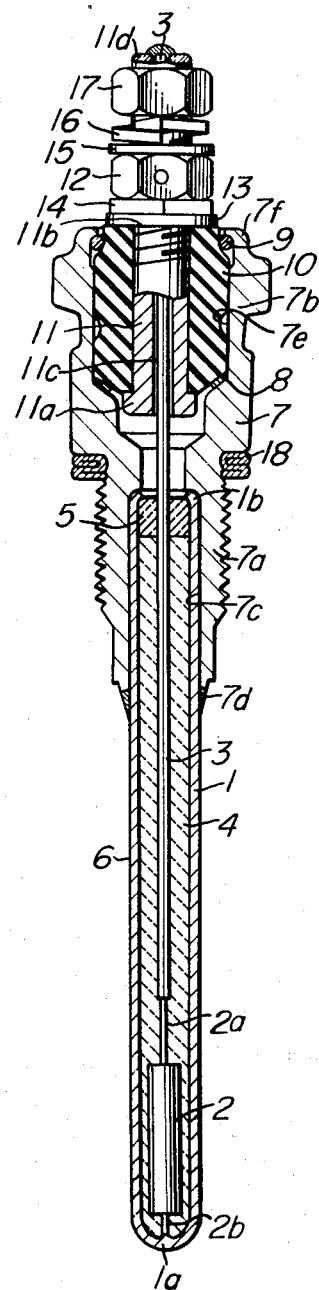
FIG. 6 is a yet another embodiment illustrating a longitudinal sectional view of a pyrometric sensor according to the invention.

Now an adapter useful for attaching a heat-sensing unit 6 as above described to a hot part whose temperature is to be measured will be explained. Referring to FIG. 6, wherein the embodiment shown in FIG. 1 is used as the heat-sensing unit 6, an adapter made of SUS42 or the like is generally indicated at 7. The adapter 7 consists of a threaded part 7a and a holder part 7b and has an axial bore therethrough. A gasket ring 18 is fitted on the circumference of the adapter 7 and along the boundary between the two parts 7a, 7b. Inside the threaded part 7a is formed a hole 7c for receiving a protecting tube 1 together with a center electrode 3 therein, and the tapered end 7d of the threaded part 7a is joined to the outer surface of the protecting tube 1. Inside the holder part 7d is formed a hole 7e for holding an insulating tube 10 therein. The tube 10 is held in place with a packing washer 8 and a metal ring 9. The outer periphery of the metal ring 9 is in contact with the end 7f of the holder part 7b which has been diametrally squeezed and bent to prevent the ring from slipping out. An upper electrode 11 of SUS42 or the like is formed with a flange 11a at one end and a threaded part 11b at the other end, and has an axial hole 11c for receiving the center electrode. The upper electrode 11 is inserted inwardly of the insulating tube 10 and holds the tube 10 in place with the flange 11a and a lock nut 12 in thread engagement with the threaded part 11b. Between the lock nut 12 and the insulating tube 10 are interposed a washer 13 and a spring washer 14. In addition, a nut 17 for lead wire connection is used on the threaded part 11b with a washer 15 and a spring washer 16 between itself and the lock nut 12. The front end 11d of the threaded part 11b is joined to the front end of the center electrode 3. Thus the adapter is so constructed that the insulating tube 10 is gripped by the adapter 7 and the upper electrode 11 is secured to the insulating tube 10 by the lock nut 12, so that the center electrode bonded to the upper electrode 11 is kept unmovable with respect to the adapter. Moreover, because the protecting tube 1 is inserted into and joined to the hole 7c of the threaded part 7a of the adapter 7, the tube 1 is kept stationary as well, thereby contributing to the improved vibration resistance of the resulting pyrometric sensor. Since the insulating tube 10 is formed of alumina ceramics, there is no possibility of the insulation between the adapter 7 and the center electrode 3 deteriorating with the temperature rise.

In accordance with the first embodiment of the invention of the present application, as has been stated above, a pyrometric thermistor 2 of cobalt aluminum oxide ($CoAl_2O_4$) or the like is inserted into a protecting tube 1, a lead wire 2b of the pyrometric thermistor 2 is connected to the protecting tube 1, the other lead wire 2a of the thermistor 2 is connected to a center electrode 3 partly inserted into the protecting tube 1, and a heat-resistant insulating material 4, e.g., magnesium oxide powder, aluminum oxide powder, a mixture of aluminum oxide powder and CaO, $SiO_2$ or MgO, or alumina ceramics, is filled in the protecting tube 1. The heat-sensing unit thus obtained with good thermal resistance is capable of measuring high temperatures. It has an additional advantage of satisfactory vibration resistance.

According to the second invention of the present application, the thermistor-free section of the heat-sensing unit 6 is partly inserted into a hole 7c of an adapter 7 through which the protecting tube is received, an insulating tube 10 is held within the adapter 7 with a packing washer 8 and a metal ring 9, an upper electrode 11 is secured to the insulating tube 10 by a flange 11a of the electrode itself and also by a lock nut 12 in thread engagement with a threaded part 11b of the electrode, and the center electrode 3 of the heat-sensing unit 6 is joined at one end to the upper electrode 11. This construction, which precludes relative movement of the protecting tube 1 and the center electrode 3, is highly contributory to the vibration resistance of the pyrometric sensor which is fabricated in the manner described. The alumina ceramics or the like used as the insulating tube 10 eliminates the danger of any insulation deterioration between the center electrode 3 and the adapter 7 with the increase of the temperature. Thus, if the change of resistance between the threaded part 11b of the upper electrode 11 and the adapter 7 is determined, the change of resistance of the thermistor 2 with the temperature can be determined and, in this way, the temperature of a hot object can be determined with a high degree of accuracy to an advantage.

We claim:

1. A pyrometric sensor including a pyrometric thermistor comprising:

a metallic protecting tube into which the pyrometric thermistor is disposed, a lead for the thermistor coupled to the tube and another lead thereof extending outwardly of the tube forming a center electrode;

solidly packed heat resistent granular dielectric material, capable of withstanding maximum temperatures of about 1,300°C, said material packed solidly about and completely enveloping the said thermistor and associated leads so as to prevent damage to the sensor due to vibrations caused by forces up to about 100 G and maintain electrical insulation at said maximum temperature.

2. The pyrometric sensor of claim 1 further including:

an adaptor having a first receiving opening for receiving an end of said protecting tube remote from the thermistor and the central electrode passing through an opening in said adaptor;

an insulating tube held within a second receiving opening at an opposite end of said adaptor remote from the protective tube, a packing washer disposed within said second receiving opening for holding the insulating tube in place and a metal washer disposed in a groove in the second receiving opening for holding the packing washer in place;

a flange for the center electrode, adapted to be engaged with the insulator and a portion representing the end of the center electrode, the flange extending outwardly past the extreme end of the second receiving opening, and locking means for securing the end of the electrode for maintaining the entire structure securely.

3. The pyrometric sensor of claim 2 wherein the end of the electrode is threaded and the locking means is a lock nut.

4. The pyrometric sensor of claim 1 wherein the heat resistent material is selected from the group consisting of:

magnesium oxide;
refractory mortar;
castable refractories;
burned aluminum oxide;
sealing glass powder;
crystalizing glass powder;
alumina ceramics; and
a mixture of 99 to 70 weight percent of alumina oxide powder and 1 to 30 weight percent of a metallic oxide powder selected from the group consisting of $CaO$, $SiO_2$ has $MgO$.

* * * * *